United States Patent [19]

Johansson et al.

[11] Patent Number: 4,552,455
[45] Date of Patent: Nov. 12, 1985

[54] METHOD AND APPARATUS FOR FUNCTIONALLY TESTING A LASER RANGEFINDER

[75] Inventors: Karl H. Johansson, Kungsbacka; Anders S. Severinsson, Lindome, both of Sweden

[73] Assignee: Telefonaktiebolaget LM Ericsson, Stockholm, Sweden

[21] Appl. No.: 443,917

[22] PCT Filed: Mar. 16, 1982

[86] PCT No.: PCT/SE82/00071
§ 371 Date: Nov. 23, 1982
§ 102(e) Date: Nov. 23, 1982

[87] PCT Pub. No.: WO82/03463
PCT Pub. Date: Oct. 14, 1982

[30] Foreign Application Priority Data

Mar. 25, 1981 [SE] Sweden ................................ 8101919

[51] Int. Cl.[4] ........................... G01C 3/25; G01C 3/00
[52] U.S. Cl. ........................................... 356/5; 356/6; 372/10
[58] Field of Search ................. 356/5, 6; 434/4; 73/5; 372/10, 70; 324/304

[56] References Cited

U.S. PATENT DOCUMENTS 3,601,488 8/1971 Plessis-Robinson .................... 356/5
4,182,570 1/1980 Courrier et al. ........................ 356/5

FOREIGN PATENT DOCUMENTS 362504 12/1973 Sweden .
1088437 10/1967 United Kingdom .

Primary Examiner—S. C. Buczinski
Assistant Examiner—Gregory C. Issing
Attorney, Agent, or Firm—Roberts, Spiecens & Cohen

[57] ABSTRACT

A laser rangefinder, where the laser is of the passive Q-switched type, is functionally tested. In a method and apparatus for functionally testing the laser rangefinder, the excitation voltage for actuating the laser is raised above the normal voltage, so that the laser sends two light pulses where it normally sends a single one. The pulses are respectively interpreted as a pulse sent from the rangefinder and as a received reflected pulse. A high-voltage unit for providing the excitation voltage is coupled with a feedback circuit in which there is included a voltage divider provided with a switch such that during testing the excitation voltage can be increased so that the laser sends the two required light pulses.

6 Claims, 1 Drawing Figure

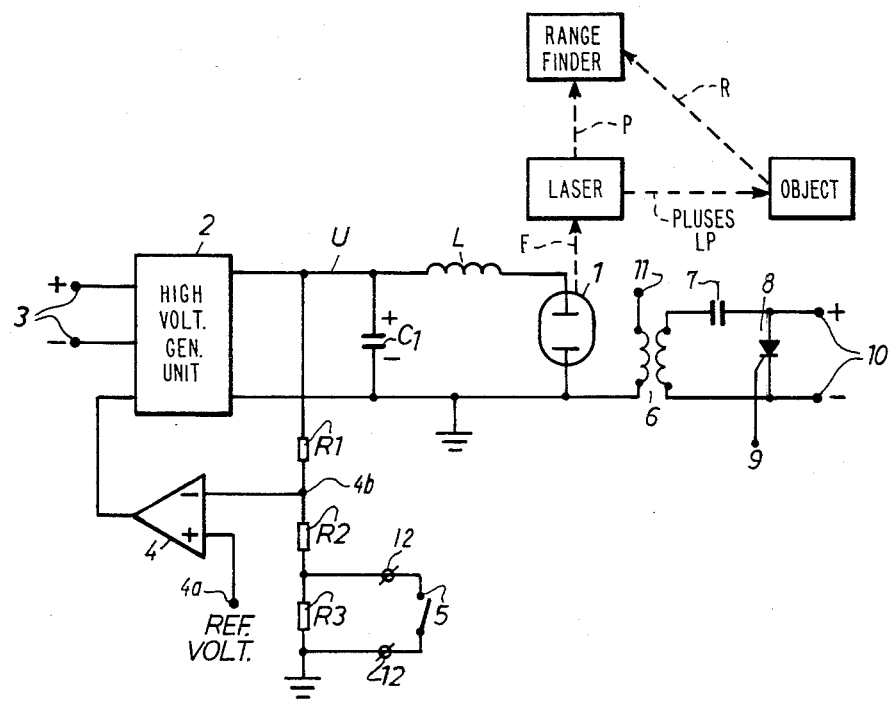

METHOD AND APPARATUS FOR FUNCTIONALLY TESTING A LASER RANGEFINDER

FIELD OF INVENTION

This invention relates to a method and apparatus for functionally testing a laser rangefinder.

BACKGROUND

Rangefinders, based on measuring the time taken for a light pulse from a laser in a rangefinder to reach an object, the distance to which is to be measured, and return to the instrument after reflection by the object, are tested for correct function and precision using a known measuring distance. Testing can therefore only be carried out at places which are specially arranged for the purpose.

It is further known that a laser of the passive Q-switched laser type can transmit more than one light impulse when the laser excitation voltage is higher than normal. This is a drawback with this type of laser, since normally it is only desired to transmit one light pulse at each measuring occasion.

SUMMARY OF INVENTION

In the method and apparatus according to the present invention, the property which is otherwise regarded as a drawback of the passive Q-switched laser has been taken advantage of, namely that it transmits two light pulses when the laser excitation voltage is raised above the normal value.

Each transmitted light pulse is reflected in a mode known per se to the rangefinder receiver, the first such pulse starting time measurement and the second one stopping it in the same way as a light pulse reflected from a remote object would also do.

In order that the excitation voltage to the laser can be raised during testing, a voltage divider in a control circuit controlling the excitation voltage is adapted for switching by a switch especially arranged for testing.

By utilizing the invention, correct functioning of the flashlamp and light receiver of a rangefinder can be tested, as well as circuits for measuring and indicating distance.

The invention is not intended for testing the precision of the distance measurement, since such testing still requires specially prepared measuring distances.

BRIEF DESCRIPTION OF DRAWING

In the accompanying drawing, the sole FIGURE is a diagram schematically illustrating the components and circuitry, of a preferred embodiment of the invention.

DETAILED DESCRIPTION

An example of a laser rangefinder in accordance with the invention is described below with reference the associated drawing. The rangefinder laser is of the passive Q-switched type.

The rangefinder laser, not shown, is adapted to transmit a short light pulse when it is struck by a light flash from the rangefinder flashlamp 1. Energy for the flashlamp is supplied by charging a capacitor C1 in series with the flashlamp 1. A choke L is also connected in series with these components.

The capacitor C1 is connected to a high-voltage generating unit 2 for the charging of the capacitor, the unit 2 being disposed for receiving a D.C. supply via terminals 3. The output of a regulating amplifier 4 is connected to the high-voltage unit for controlling its output voltage. A constant reference voltage is connected to one input terminal 4a of the amplifier, and to a second input thereof is connected a junction 4b in a voltage divider comprising three resistors R1, R2 and R3. The voltage divider is connected between the pole with the high voltage U and the other grounded pole of the high-voltage unit. A switch 5 is coupled across the resistor R3, which is nearest the grounded side of the voltage divider, for short-circuiting the resistor 3 when closed.

A pulse transformer 6, in this connection called a triggering transformer, has one winding connected to one of the poles of the flashlamp 1. The second winding of the transformer is included in a circuit where the winding is in series with a capacitor 7 and a thyristor 8. The thyristor is adapted to be made conductive by a voltage pulse on a terminal 9 connected to the thyristor 8. The capacitor 7 is intended for charging by a D.C. source connected to terminals 10.

The described apparatus is made ready for actuating the laser in the rangefinder to give one or more light pulses by direct voltage being applied to the terminals 3, so that the capacitor C1 is charged to high voltage by the high-voltage generating unit 2. With the switch 5 open, the voltage divider including resistors R1, R2, and R3 leads a part of the voltage U to one of the inputs on the regulating amplifier 4. The voltage U is kept to a value such that the voltage fed back from the voltage divider to the amplifier will equal that of the constant reference voltage at terminal 4a.

By coupling direct voltage to the terminals 10, the capacitor 7 coupled to the triggering transformer 6 is also charged. The apparatus is now ready to release light pulses from the laser.

The thyristor 8 is made conductive by a direct voltage connected to the terminal 9. The capacitor 7 is then discharged by a current shock to one winding of the triggering transformer 6. In the second winding thereof there is induced a high voltage at its free pole or terminal 11, which then gives rise to an electric field adapted for actuating the flashlamp 1. A flash is thus released in the flashlamp and the charge of the capacitor C1 is discharged in the form of a current through the lamp.

The flash from the flashlamp actuates the laser to transmit a light pulse. With the selected voltage division in the voltage divider including resistors R1, R2, and R3, the voltage U across the capacitor C1 is just high enough, and the flash from the flashlamp just strong enough, for the laser to give a single light pulse.

If the apparatus is instead made ready to give a flash pulse with the switch 5 closed, the portion of the voltage U which is fed back to the amplifier 4 will be less than before, the voltage being regulated to a higher value than in the former case. The voltage U in this case is selected to be sufficiently high for the flash F from the flashlamp 1 to be strong enough for the laser to give two light pulses LP within a short time interval.

The rangefinder optics are disposed for reflecting to its light receiver a small portion P of the light in the pulses sent by the laser. As always, the reflection of the light pulse first sent starts the time measurement of the rangefinder. Reflection of the second light pulse sent from the laser is recognized in the rangefinder in the same way as a pulse R reflected from a target, and will stop the time measurement. The time interval from start to stop is recalculated as a distance.

Thus by the described mode and with the described apparatus, it is seen that the rangefinder can transmit laser pulses, that its light receiver can receive reflected laser radiation, and that its time measurement circuits are functional and can indicate a distance.

It is customary that in the described functional test the voltage across the capacitor C1 is selected such that the time interval between both light pulses is nominally 30 μs, corresponding to a measuring distance of 4500 meters. Other settings of the time interval and measuring distance are naturally possible also. For the same rangefinder, the time interval on different occasions can vary up to ±20 percent. The functional test is therefore not suitable for checking the accuracy of the rangefinder, but solely for checking its correct function.

Only very simple additional equipment is necessary for the functional test. Only the resistor R3 and the switch 5 have been added, the remaining components in the described apparatus normally being associated with the laser rangefinder. The resistor R3 is built into the rangefinder, while the switch 5 is accommodated in a special auxiliary testing unit which can be connected to the rangefinder via a connection means 12. Alternatively, the switch 5 can be built into the rangefinder and disposed for resetting by means of a push button on the rangefinder.

The operation of the function testor is based on the property of the passive Q-switched laser that when the voltage U on the capacitor C1 is within a given range, the laser sends a single light pulse when the capacitor is discharged, while when the voltage U is increased, the laser sends more than one light pulse, the number of light pulses for increasing U increasing to two, three and even more. In some cases, for a laser to send more than one light pulse is often a drawback, but in the method and apparatus for functional testing the otherwise undesired property of the laser has been turned to advantage.

Test apparatus provided with means equivalent to those described are also regarded as being embraced by the following claims. For example, the voltage divider can be made with capacitors instead of resistors.

What we claim is:

1. A method of functionally testing a laser rangefinder operative in association with a laser adapted for transmitting light pulses, and in which rangefinder is included a flashlamp (1) adapted to respond to high-voltage electrical energy for generating flashes which are transmitted to the laser for initiating transmission of light pulses by the laser, said flashlamp being normally controlled such that said laser generates a normal single pulse in response to each of said light pulses, a capacitor (C1) for accumulating electrical energy for application to the flashlamp, and a controllable high-voltage unit (2) for charging the capacitor (C1) to a selected D.C. voltage (U), said method comprising raising the D.C. voltage (U) supplied by the high-voltage unit (2) to a value high-enough for the laser to be actuated to send two light pulses within a short time interval, as against the normal single pulse, reflecting to said rangefinder at least part of each of said two pulses, and interpreting the reflected parts of the pulses in the rangefinder respectively as a pulse sent from the laser and as a received, reflected pulse.

2. A method as claimed in claim 1, in which the controllable high-voltage unit (2) is connected to a variable feedback circuit including a voltage divider (4, R1, R2, R3) adapted for regulating the direct voltage (U) to a selected value, said method comprising raising the voltage supplied by the high voltage unit (2) to the said value by short-circuiting a portion of said voltage divider by operating a switch connected across said portion.

3. Apparatus for functionally testing a laser rangefinder operative in association with a laser adapted for transmitting light pulses, and in which rangefinder is included a flashlamp (1) adapted to respond to high-voltage electrical energy for generating flashes which are transmitted to the laser for initiating transmission of light pulses by the laser, said flashlamp being normally controlled such that said laser generates a normal single pulse in response to each of said light pulses, a capacitor (C1) for accumulating electrical energy for application to the flashlamp, and a controllable high-voltage unit (2) for charging the capacitor (C1) to a selected D.C. voltage (U), said apparatus further comprising a switch means operatively associated with said high-voltage unit for raising the direct voltage (U) provided by the high-voltage unit (2) to a value sufficiently high for the laser to be actuated to generate first and second light pulses within a short time interval, instead of the normal single light pulse, the rangefinder including means for interpreting the first pulse as one sent from the rangefinder and the second pulse as a received, reflected light pulse.

4. Apparatus as claimed in claim 3, comprising and wherein the controllable high-voltage unit (2) is connected to a variable feedback circuit means (4, R1, R2, R3) for regulating the D.C. voltage (U) supplied by the unit to a selected value, said switch means comprising a switch (5) coupled to and adapted for short circuiting a portion of the variable feedback circuit means (4, R1, R2, R3) such that the D.C. voltage (U) from the high-voltage unit (2) is regulated to said higher value.

5. Apparatus as claimed in claim 4, wherein the feedback circuit means includes a voltage divider and a regulating amplifier (4) including one input terminal supplied with a constant reference voltage (REF) and another input terminal supplied with a selected portion of the voltage (U) of the high-voltage unit (2) via said voltage divider (R1, R2, R3) which is coupled thereto.

6. Apparatus as claimed in claim 5, wherein the voltage divider comprises a plurality of interconnected resistors.

* * * * *